United States Patent
Li et al.

(10) Patent No.: US 10,397,770 B2
(45) Date of Patent: Aug. 27, 2019

(54) MITIGATING PAGING COLLISIONS IN DUAL STANDBY DEVICES

(71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 763 days.

(21) Appl. No.: 14/499,002

(22) Filed: Sep. 26, 2014

(65) Prior Publication Data
US 2015/0350877 A1      Dec. 3, 2015

Related U.S. Application Data

(60) Provisional application No. 62/005,643, filed on May 30, 2014.

(51) Int. Cl.
  *H04W 8/18*    (2009.01)
  *H04W 8/20*    (2009.01)
  *H04W 68/00*   (2009.01)

(52) U.S. Cl.
  CPC ............ *H04W 8/183* (2013.01); *H04W 8/205* (2013.01); *H04W 68/005* (2013.01)

(58) Field of Classification Search
  CPC ....... H04W 8/18; H04W 8/183; H04W 8/186; H04W 68/02
  See application file for complete search history.

(56) References Cited

U.S. PATENT DOCUMENTS

| | | | | |
|---|---|---|---|---|
| 2012/0117635 | A1* | 5/2012 | Schell | G06F 21/34 726/9 |
| 2013/0157673 | A1* | 6/2013 | Brusilovsky | H04W 8/205 455/450 |
| 2014/0038666 | A1* | 2/2014 | Chin | H04W 88/06 455/552.1 |
| 2014/0106750 | A1* | 4/2014 | Roullier | H04W 48/20 455/436 |

OTHER PUBLICATIONS

3rd Generation Partnership Project, Technical Specification Group Radio Access Network, Evolved Universal Terrestrial Radio Access (E-UTRA), User Equipment (UE) procedures in idle mode (Release 12); 3GPP TS 36.304 V12.0.0; 3GPP Organizational Partners; Mar. 2014; 34 pgs.

* cited by examiner

*Primary Examiner* — Dong-Chang Shiue
(74) *Attorney, Agent, or Firm* — Dickinson Wright RLLP

(57) ABSTRACT

Disclosed herein is a technique for mitigating paging collisions in mobile devices. When a new electronic Subscriber Identity Module (eSIM) is to be provisioned on a mobile device, International Mobile Subscriber Identity (IMSI) information associated with each of the SIMs/eSIMs currently installed on the mobile device is obtained and provided to a provisioning server. In turn, the provisioning server utilizes the IMSI information to select a new eSIM associated with an IMSI that is unlikely to result in a paging collision when operated alongside the SIMs/eSIMs installed on the mobile device. The provisioning server provides the new eSIM to the mobile device, whereupon the mobile device installs the eSIM into the embedded Universal Integrated Circuit Card (eUICC) for operation.

20 Claims, 5 Drawing Sheets

MITIGATING PAGING COLLISIONS IN DUAL STANDBY DEVICES

CROSS-REFERENCE TO RELATED APPLICATIONS

The present application claims the benefit of U.S. Provisional Application No. 62/005,643, entitled "MITIGATING PAGING COLLISIONS IN DUAL STANDBY DEVICES" filed May 30, 2014, the content of which is incorporated herein by reference in its entirety for all purposes.

FIELD

The described embodiments set forth a technique for mitigating paging collisions in mobile devices.

BACKGROUND

Most mobile devices (e.g., smart phones) are configured to utilize removable Universal Integrated Circuit Cards (UICCs) that provide access to wireless network services managed by mobile network operators (MNOs). A UICC typically takes the form of a small removable card (e.g., a Subscriber Identity Module (SIM) card) that is inserted into a mobile device. Some mobile devices are capable of supporting two SIM cards in a standby mode. These mobile devices are usually referred to as Dual SIM Dual Standby (DSDS) devices. In some cases, a first SIM card in a DSDS device can enable the DSDS device to communicate with a first wireless network (e.g., provided by a first MNO), and a second SIM card in the DSDS device can enable the DSDS device to communicate with a second wireless network (e.g., provided by a second MNO that is different than the first MNO). In some cases, each SIM card is associated with different wireless networks provided by the same MNO.

The DSDS device periodically wakes from a power saving sleep state to monitor paging channels for each of the two wireless networks. If the DSDS device wakes to monitor two separate paging channels associated with each of the two wireless networks during overlapping or identical time slots, a paging collision can occur. Such paging collision can result in, for example, missed phone calls, and can lead to a degraded customer experience. In some implementations, embedded UICCs (eUICCs) are being included on system boards of mobile devices and are used in place of, or to supplement, removable UICCs. The eUICCs are configured to manage multiple Electronic Subscriber Identity Modules (eSIMs) associated with one or more wireless networks. Paging collisions can occur within eUICC-based mobile devices just as paging collisions can occur in UICC-based mobile devices (e.g., a DSDS device). This problem is exacerbated by the implementation of eUICCs that are capable of managing multiple eSIMs, which increases the probability for paging collisions to occur.

SUMMARY

Representative embodiments set forth herein disclose various techniques for mitigating paging collisions at a mobile device by utilizing device-specific information, e.g., International Mobile Subscriber Identity (IMSI) information. Specifically, when the mobile device issues a request for a new electronic Subscriber Identity module (eSIM) to be provisioned on the mobile device, the mobile device is configured to gather IMSI information associated with (i) SIMs stored in removable Universal Integrated Circuit Cards (UICCs) included in the mobile device, and/or (ii) eSIMs stored in an embedded UICC (eUICC) included in the mobile device. After obtaining the IMSI information, the mobile device issues the request for the new eSIM to a provisioning server, where the request includes the obtained IMSI information as well as one or more parameters (e.g., an identifier for a mobile network operator (MNO)) associated with the new eSIM.

The provisioning server, upon receiving the request from the mobile device, is configured to utilize the IMSI information when selecting the new eSIM to be provided to the mobile device. Specifically, the provisioning server identifies a pool of eSIMs that satisfy the parameters included in the request (e.g., a pool of eSIMs associated with an MNO operator specified in the request). Subsequent to identifying the pool of eSIMs, the provisioning server performs a paging occasion calculation for each of the installed SIMs/eSIMs based on the IMSI information received from the mobile device. The provisioning server also performs a paging occasion calculation for each of the eSIMs included in the identified pool of eSIMs, and selects the new eSIM for the mobile device from the identified pool of eSIMs based on the results of the paging occasion calculations. Based on this approach, the provisioning server utilizes the IMSI information to select the eSIM for the mobile device, the eSIM having an associated IMSI that is unlikely to result in a paging collision when operated alongside the SIMs/eSIMs installed on the mobile device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
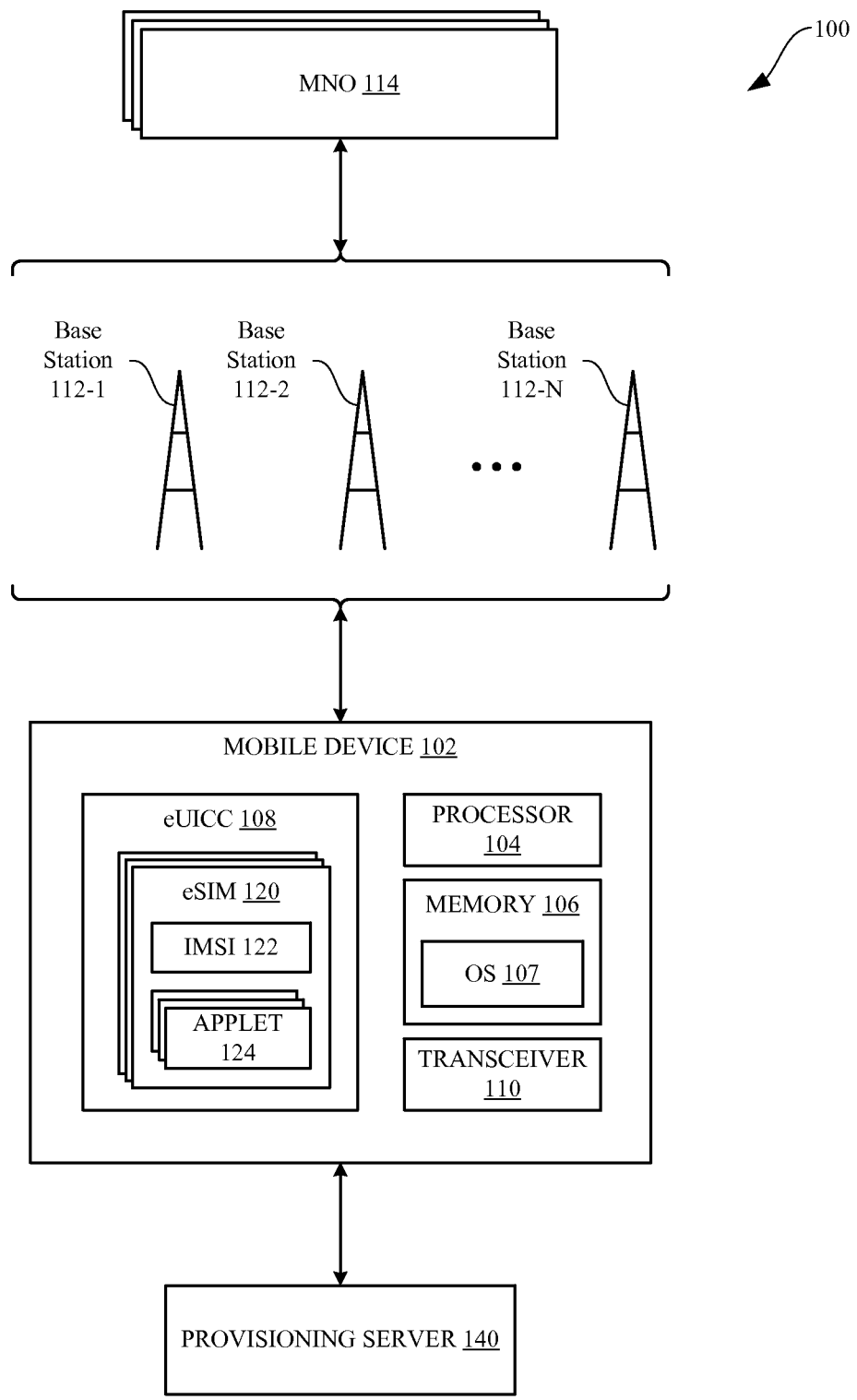
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Typically, in a discontinuous reception (DRX) mode, a DSDS mobile device periodically wakes up to monitor paging channels (e.g., Paging Indication Channel—PICH) associated with two different mobile network operators (MNOs) with which the mobile device is interacting. If the mobile device wakes up to monitor paging channels associated with the two MNOs in overlapping or identical time slots, a paging collision can occur. Such paging collisions can cause connectivity issues and lead to a degraded customer experience.

To mitigate paging collisions, the embodiments described herein provide techniques that utilize International Mobile Subscriber Identity (IMSI) information associated with electronic Subscriber Identity Modules (eSIMs) that are currently installed on an embedded Universal Integrated Circuit Cart (eUICC) of a mobile device. In some cases, the mobile device can include, in addition to the eUICC, one or more receiving bays for removable UICCs on which Subscriber Identity Modules (SIMs) are installed. In either case, when a new eSIM is to be provisioned on the mobile device, the IMSI information associated with the installed SIMs/eSIMs is obtained. More specifically, the mobile device gathers the IMSI information from the UICCs/eUICCs and provides the IMSI information associated with the SIMs/eSIMs to a provisioning server.

The provisioning server receives the IMSI information and is configured to perform, for each of the SIMs/eSIMs installed on the mobile device, a paging occasion calculation using the IMSI information associated with the SIM/eSIM, according to some embodiments. The provisioning server also performs a paging occasion calculation for each of the eSIMs included in an identified pool of candidate eSIMs for the new eSIM to be provisioned on the mobile device. Based on this approach, the provisioning server utilizes the IMSI information to select an eSIM with an associated IMSI that is unlikely to result in a paging collision when operated alongside the SIMs/eSIMs installed on the mobile device.

Accordingly, the foregoing approaches provide techniques for selecting an eSIM with an IMSI that is unlikely to result in paging collisions. A more detailed discussion of these techniques is set forth below and described in conjunction with FIGS. 1-5, which illustrate detailed diagrams of systems and methods that can be used to implement these techniques.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102 and a group of base stations 112 that are managed by different MNOs 114. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed. The communication networks associated with the MNOs can include Global System for Mobile Communications (GSM) networks, Code Division Multiple Access (CDMA) networks, Long Term Evolution (LTE) networks, and the like. As shown in FIG. 1, the mobile device 102 can include a processor 104, a memory 106, an embedded UICC (eUICC) 108, and a radio transceiver 110. The processor 104, in conjunction with the memory 106, can implement a main operating system (OS) 107 of the mobile device 102 that is configured to execute native OS applications and user applications.

The eUICC 108 represents a non-removable UICC that is embedded directly within a main system board (i.e., soldered to the system board) of the mobile device 102. As illustrated in FIG. 1, the eUICC 108 can be configured to store multiple eSIMs 120. Each eSIM 120 is a software emulation of a typical SIM (e.g., stored in a removable UICC) and contains analogous application and subscriber/user data. Each eSIM 120 can be associated with a different MNO 114, thereby enabling a mobile device 102 in which the eSIMs 120 are included to authenticate with a number of different MNOs 114 through the base stations 112. For example, the eUICC 108 can be configured to store an eSIM 120 for each MNO 114 with which the mobile device is interacting. When a particular eSIM 120 of the multiple eSIMs 120 receives a call via a corresponding MNO 114, the particular eSIM 120 is active while the other eSIMs 120 become inactive (i.e., do not receive any calls). The eSIMs 120 share a single radio transceiver 110 to connect to the different MNOs 114. Although not illustrated in FIG. 1, the mobile device 102 can also be configured to include a receiving bay for a removable UICC that manages one or more SIMs. In this manner, the mobile device 102 can be further configured to provide the benefit of multi-MNO connectivity using a variety approaches, e.g., activating one eSIM 120 managed by the eUICC 108 to connect to a first MNO 114 and activating another SIM managed by a removable UICC to connect to a second MNO 114.

Each eSIM 120 can be associated with a unique identifier 122 (for example, International Mobile Subscriber Identity (IMSI)) and can include multiple applets 124 that define the manner in which the eSIM 120 operates. For example, one or more of the applets 124, when implemented by the eUICC 108, can be configured to enable the mobile device 102 to communicate with MNOs 114 and provide useful features (e.g., phone calls and internet) to a user of the mobile device 102. Although not illustrated in FIG. 1, the eUICC 108 can include a microprocessor and a storage device that contains computer-executable instructions that, when executed by the microprocessor, cause the microprocessor to perform the various operations described herein.

When operating in DRX mode, the mobile device 102 is configured to periodically wake up to monitor paging channels (e.g., Paging Indication Channel—PICH) associated with the different MNOs 114. A paging occasion refers to a time at which the mobile device 102 wakes up to monitor the PICH associated with a particular MNO 114. Hence, the mobile device 102 maintains paging occasions for each of the MNOs with which the mobile device is interacting. The mobile device 102 wakes up only once during a particular paging occasion to read a paging indicator (PI) carried in the PICH. Based on the PI, the mobile device 102 can determine whether there is an upcoming paging message for the mobile device 102 on an associated paging channel (PCH) in the SCCPCH (Secondary Common Control Physical Channel) frame. If the PI indicates that there is no upcoming paging message, the mobile device 102 goes back into a sleep mode. If the PI indicates that there is an upcoming paging message, the mobile device 102 monitors the PCH for the paging message. A paging occasion for the mobile device 102 can be calculated based on IMSI information as follows according to equation (1) set forth below.

$$\text{Paging Occasion} = \{(\text{IMSI div } K) \bmod \text{DRX Cycle Length}\} + (n \cdot \text{DRX Cycle Length}) \qquad (1)$$

According to equation (1), K represents the number of available SCCPCHs that carry a PCH, and n is set at zero and is incremented by one until the paging occasion exceeds a particular threshold, e.g., four thousand ninety-five (4095).

A paging indicator (PI) for the mobile device 102 can be calculated according to equation (2) set forth below.

$$\text{Paging Indicator} = (\text{IMSI div } 8192) \bmod N_p \qquad (2)$$

According to equation (2), $N_p$ represents the number of paging indicators per PICH frame.

As previously noted herein, in some instances, if the mobile device 102 wakes up to monitor paging channels associated with at least of two of the MNOs 114 in overlapping or identical time slots, a paging collision can occur. To mitigate such paging collisions, IMSI information associated with SIMs/eSIMs currently installed on the mobile device 102 is used by a provisioning server to select a new eSIM 120 with an IMSI that is unlikely to result in a paging collision when operating alongside the SIMs/eSIMs installed on the mobile device 102.

Figure 2:
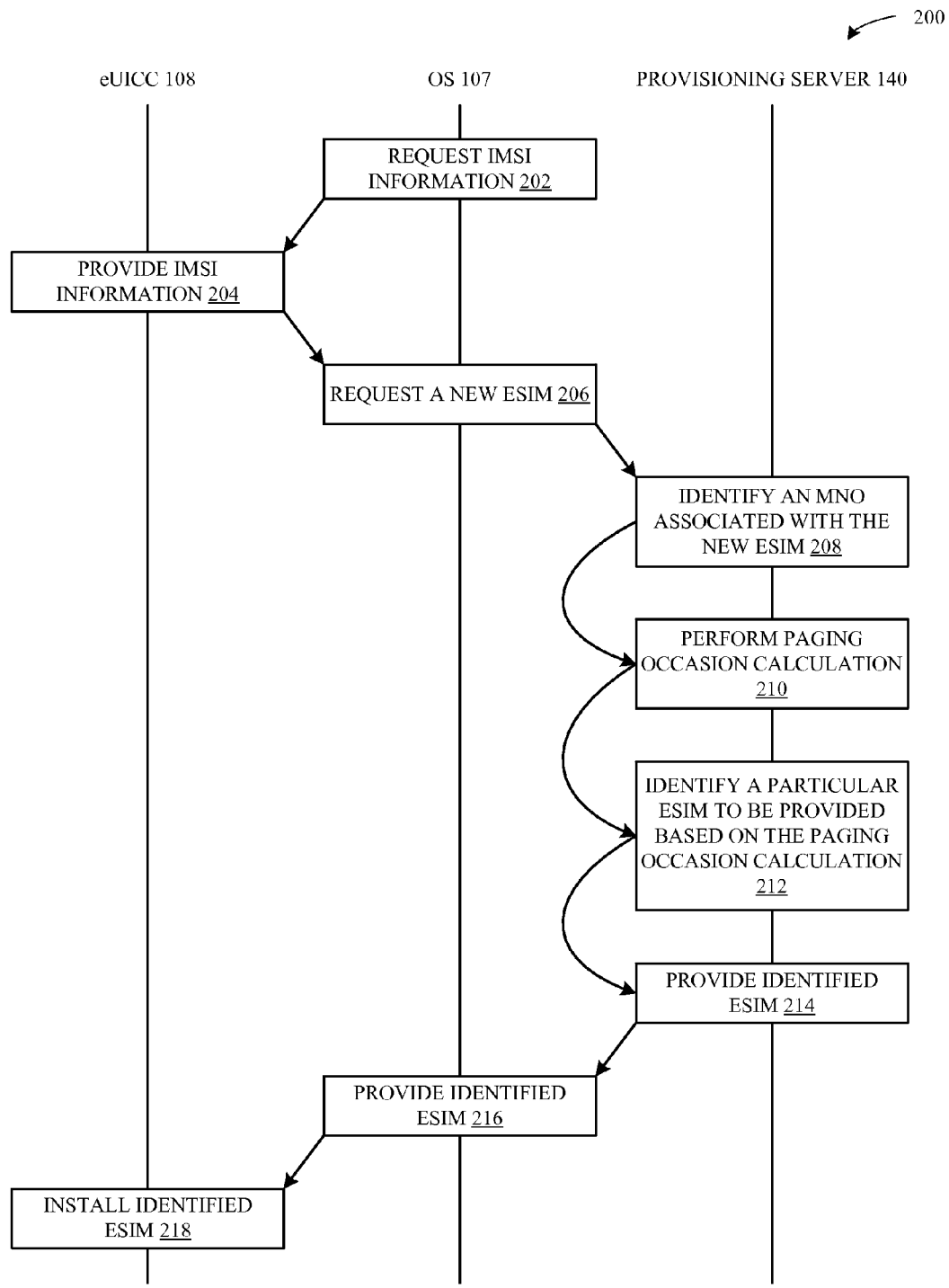
FIG. 2 illustrates a sequence diagram of a method for enabling provisioning of a new eSIM on a mobile device, according to some embodiments.

FIG. 2 illustrates a sequence diagram of a method 200 for provisioning a new eSIM 120 on the mobile device 102, according to some embodiments. As shown, the method 200 begins at step 202, where the OS 107 executing on the mobile device 102 issues, to the eUICC 108, a request for IMSI information associated with the SIMs/eSIMs installed on the eUICC 108. At step 204, the eUICC 108, in response to the request received from the mobile device 102, provides the IMSI information associated with each of the installed SIMs/eSIMs to the OS 107.

At step 206, the OS 107 issues, to the provisioning server 140 (as shown in FIG. 1), a request for a new eSIM 120, where the request includes the IMSI information associated with each of the eSIMs installed on the mobile device 102. It will be understood that the steps of FIG. 2 are not limited to obtaining IMSI information only for eSIMs included in the eUICC 108. For example, in embodiments where the mobile device 102 is configured to include, in addition to an eUICC, a removable UICC that manages one or more SIMs, the OS 107 can request IMSI information associated with the SIMs and eSIMs from the UICC and eUICC, respectively (in step 202). Similarly, in step 204, UICC and/or eUICC may provide the IMSI information associated with the SIMs and/or eSIMs to the OS 107.

The request can further include an MNO identifier that identifies an MNO 114 that corresponds to the new eSIM 120. According to one embodiment, provisioning server 140 is a server hosted/operated by a third-party entity that includes a pool of available eSIMs 120 (i.e., available to be provisioned on mobile devices) associated with one or more of the MNOs 114. The OS 107 of the mobile device 102 communicates with the provisioning server 140 via a network or a combination of networks. The network(s) can include MNO networks, a wired or wireless local area network (LAN), a wide area network, and/or other networks.

Steps 208-214 represent a series of steps performed by the provisioning server 140 in response to receiving the request for a new eSIM 120. At step 208, the provisioning server 140 identifies the MNO 114 associated with the new eSIM 120. According to one embodiment, the provisioning server 140 identifies a pool of available eSIMs 120 associated with the identified MNO 114. At step 210, provisioning sever 140 performs a paging occasion calculation for each of the eSIMs 120 installed on the mobile device 102 based on the IMSI information included in the request. The provisioning server 140 also performs a paging occasion calculation for each of the available eSIMs 120 in the pool. At step 212, the provisioning server 140 can, based on the paging occasion calculation (of the installed eSIMs 120 and the available eSIMs 120), identify a particular eSIM 120 to be provided the mobile device 102 from the identified pool of available eSIMs 120, wherein the particular eSIM 120 is unlikely to result in a paging collision when in use with the SIMs/eSIMs currently installed on the mobile device 102. At step 214, the provisioning server 140 can provide the identified eSIM 120 to the mobile device 102.

Finally, at step 216, mobile device 102 provides the identified eSIM 120 to the eUICC 108. At step 218, the eUICC 108 installs the identified eSIM 120 onto the eUICC 108.

According to an embodiment, the IMSI information associated with the eSIMs 120 that is included in the request is signed by the eUICC 108. In this case, when the provisioning server 140 receives the IMSI information from the mobile device 102, the provisioning server 140 can check the signature to ensure that the IMSI information is received from a legitimate mobile device 102.

According to another embodiment, instead of including the IMSI information for each eSIM 120 in the request at step 206, a value calculated based on the IMSI (e.g., IMSI div 8192) for each eSIM 120 can be included in the request. By doing so, the complete IMSI associated with the eSIMs 120 is not revealed and user privacy is not compromised. The provisioning server 140 can be configured to perform the paging occasion calculation based on the provided value, where the provisioning server can determine the complete IMSI based on the provided value and perform the paging occasion calculation accordingly.

According to yet another embodiment, the IMSI information associated with an available eSIM 120 is stored within a metadata section of the eSIM 120. The eSIM 120 may be encrypted while the metadata is not encrypted but still protected. In this manner, the provisioning server 140 can identify a particular eSIM 120 to be provided to the mobile device 102 without having to decrypt the eSIM 120.

Furthermore, while the provisioning server 140 is described as being a third-party server, the provisioning server 140 can include a separate provisioning server hosted/operated by each MNO 114. In this case, the mobile device 102 may send a request for the new eSIM 120 to the appropriate provisioning server 140 (i.e., the provisioning server associated with the MNO whose eSIM is requested). Each provisioning server 140 stores a pool of available eSIMs 120 for the corresponding MNO 114 and is configured to identify a particular eSIM 120 to be provided to the mobile device 102 based on the paging occasion calculations.

Also, while the SIMs/eSIMs in the mobile device 102 are described as being associated with different MNOs 114, it will be readily appreciated that the mobile device 102 may include one or more SIMs/eSIMs associated with a single MNO 114 (for example, one SIM/eSIM for personal use and a second SIM/eSIM for business use). Each of these SIMs/eSIMs may have an associated IMSI and the techniques described herein can be applied to this scenario as well, where the provisioning server 140 can be used to provide a new eSIM 120 associated with the same MNO 114 or a different MNO 114 to the mobile device 102.

Based on the foregoing techniques described in FIG. 2, the provisioning server 140 can use the IMSI information associated with SIMs/eSIMs installed on the mobile device 102 to pick out an eSIM 120 associated with an IMSI that is unlikely to result in a paging collision when in use with the currently installed SIMs/eSIMs.

Figure 3:
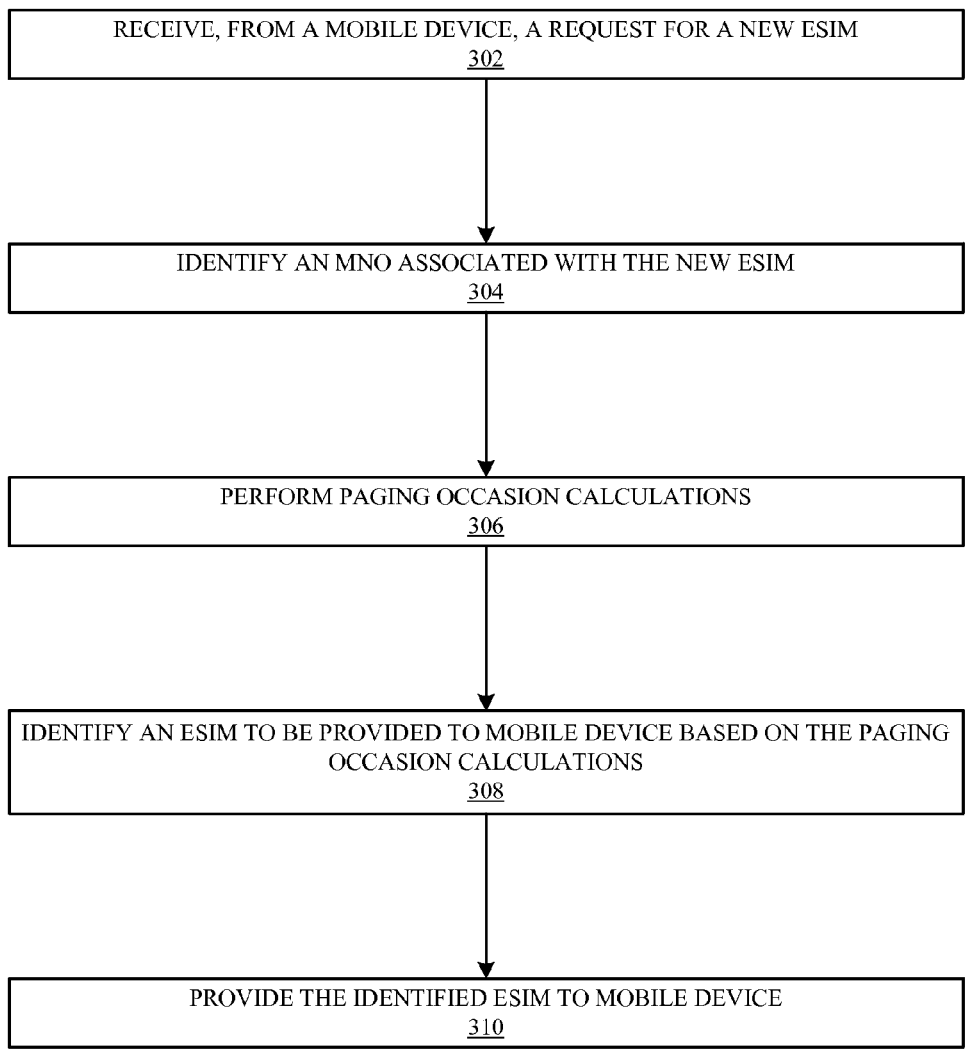
FIG. 3 illustrates a sequence diagram of a method that is carried out by a provisioning server of FIG. 1, and involves identifying a particular eSIM to be provided to a mobile device of FIG. 1, according to some embodiments.

FIG. 3 illustrates a sequence diagram of a method 300 that is carried out by the provisioning server 140 of FIG. 1, and involves identifying a particular eSIM 120 to be provided to the mobile device 102, according to some embodiments. As shown, the method 300 begins at step 302, where the provisioning server 140 receives, from the mobile device 102 a request for a new eSIM 120. According to one embodiment, the request includes the IMSI information associated with each of the SIMs/eSIMs installed on the mobile device 102. The request can further include an MNO identifier that identifies an MNO 114 associated with the new eSIM 120. At step 304, the provisioning server 140 identifies the MNO 114 based on the MNO identifier included in the request. According to one embodiment, the provisioning server 140 identifies a pool of available eSIMs 120 associated with the identified MNO 114. At step 306, the provisioning server 140 performs a paging occasion calculation for each of the installed eSIMs 120 based on the IMSI information included in the request. The provisioning server 140 also performs a paging occasion calculation for each of the available eSIMs 120 within the identified pool.

At step 308, the provisioning server 140 identifies a particular eSIM 120 to be provided to the mobile device 102. The particular eSIM 120 is identified based on the paging occasion calculation of the installed eSIMs 120 and the available eSIMs 120, as described herein. The identified eSIM 120 is unlikely to result in a paging collision when operating alongside the SIMs/eSIMs installed on the mobile device 102. At step 310, the identified eSIM is provided to the mobile device 102, whereupon the mobile device 102 can install the identified SIM and interface with the identified MNO 114.

Figure 4:
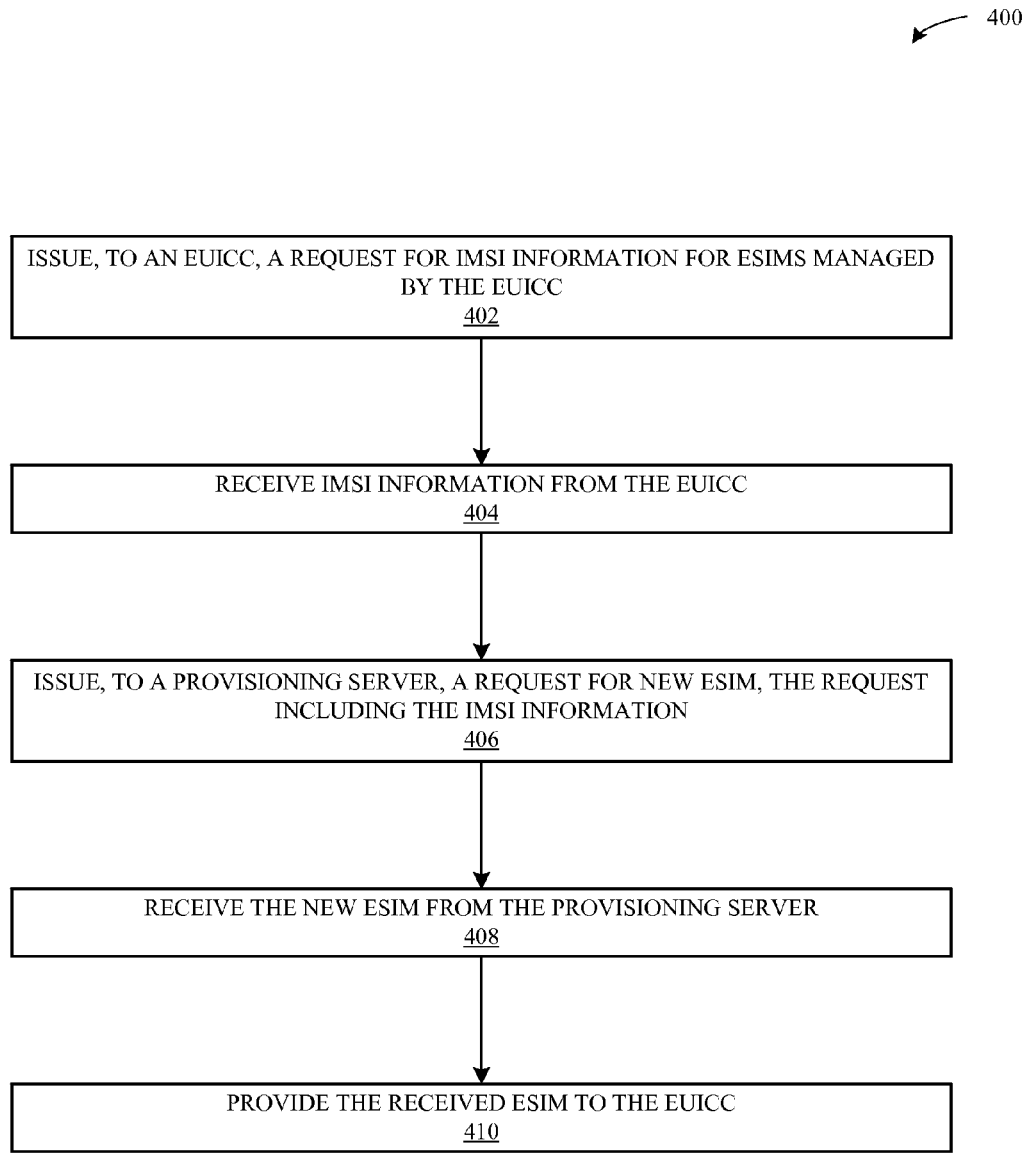
FIG. 4 illustrates a sequence diagram of a method that is carried out by a mobile device of FIG. 1, and involves requesting a new eSIM for the mobile device, according to some embodiments.

FIG. 4 illustrates a sequence diagram of a method 400 that is carried out by the OS 107 of the mobile device 102 of FIG. 1, and involves requesting a new eSIM 120 for the mobile device 102, according to some embodiments. As shown, the method 400 begins at step 402, where the OS 107 of the mobile device 102 issues, to the eUICC 108, a request for IMSI information for eSIMs 120 managed by the eUICC 108. Although not illustrated in FIG. 4, the OS 107 can be configured to identify removable UICCs, if any, included in the mobile device 102, and to identify IMSI information for SIMs installed on the removable UICCs. At step 404, the OS 107 receives, from the eUICC 108, the IMSI information associated with the one or more eSIMs 120. At step 406, the OS 107 issues, to the provisioning server 140, a request for a new eSIM 120, where the request includes the IMSI information. At step 408, the OS 107 receives the new eSIM 120 from the provisioning server 140 in response to the request. As indicated herein, the received eSIM 120 includes an IMSI that is unlikely to result in a paging collision when in use with the SIMs/eSIMs installed on the mobile device 102. At step 410, the OS 107 provides the received eSIM 120 to the eUICC 108 for installation.

Figure 5:
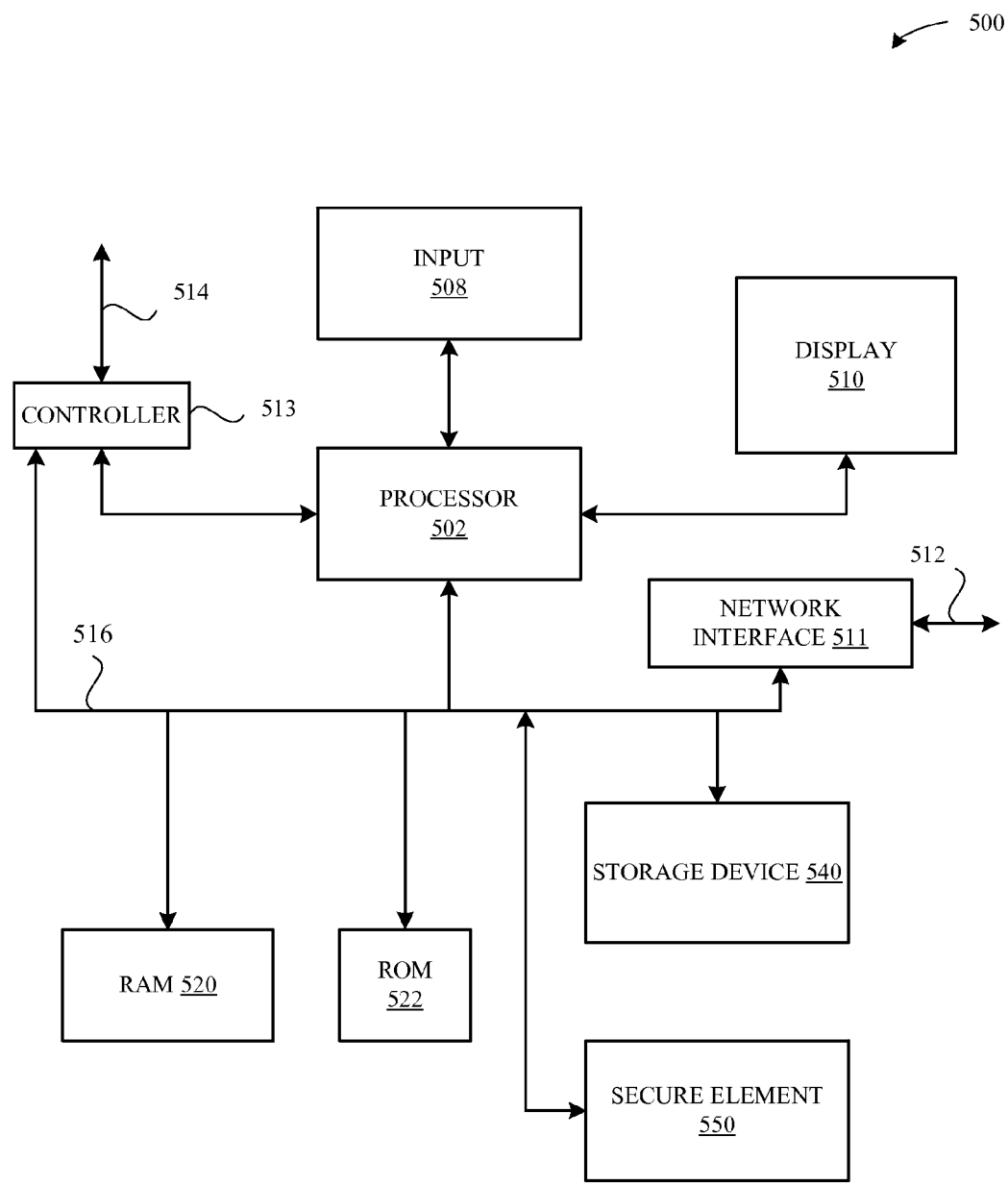
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the mobile device 102 or provisioning server 140 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver. For example, for mobile device 102, the network/bus interface 511 can include radio transceiver 110 to connect with a plurality of communication networks associated with a plurality of mobile network operators.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the mobile device 102 or provisioning server 140. When used as a mobile device 102, the computing device 500 includes a secure element 550, which can represent the eUICC 108 illustrated in FIG. 1 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
at a provisioning server:
receiving, from a mobile device, a first provisioning request comprising at least a portion of a first international mobile subscriber identity (IMSI), wherein: i) the first IMSI is associated with a first electronic subscriber identity module (eSIM), ii) the first eSIM is present on an embedded universal integrated circuit card (eUICC), iii) the eUICC is included in the mobile device, iv) the first provisioning request is for a second eSIM, and v) the second eSIM is associated with a second IMSI different than the first IMSI;
identifying, based on the at least a portion of the first IMSI, a particular eSIM as the second eSIM to provide to the mobile device; and
providing, to the mobile device, the particular eSIM.

2. The method of claim 1, further comprising, at the provisioning server:
performing paging occasion calculations using the at least a portion of the first IMSI.

3. The method of claim 2, wherein the particular eSIM is identified based on the paging occasion calculations.

4. The method of claim 1, wherein the provisioning server manages, for each mobile network operator (MNO) of a plurality of MNOs, a pool of available eSIMs associated with the MNO.

5. The method of claim 1, wherein the first provisioning request further comprises a mobile network operator (MNO) identifier that identifies an MNO associated with the second eSIM.

6. The method of claim 5, further comprising, at the provisioning server:
identifying the MNO based on the MNO identifier included in the first provisioning request.

7. The method of claim 6, further comprising, at the provisioning server:
identifying a pool of available eSIMs associated with the identified MNO, wherein the particular eSIM is identified from the pool of available eSIMs.

8. The method of claim 1, wherein the particular eSIM is associated with a particular IMSI that is unlikely to result in a paging collision when operated alongside the first eSIM.

9. A mobile device, comprising:
an embedded universal integrated circuit card (eUICC) on which a first electronic subscriber identity module (eSIM) is present;
a processor; and
a memory configured to store instructions that, when executed by the processor, cause the mobile device to carry out steps that include:
issuing, to the eUICC, a request for a first international mobile subscriber identity (IMSI) of the first eSIM,
receiving, from the eUICC, at least a portion of the first IMSI,
issuing, to a provisioning server, a request for a second eSIM, wherein the request includes the at least a portion of the first IMSI, and
receiving, from the provisioning server, the second eSIM, wherein the second eSIM is associated with a second IMSI different than the first IMSI.

10. The mobile device of claim 9, wherein the at least a portion of the first IMSI is signed by the eUICC.

11. The mobile device of claim 9, wherein the at least a portion of the first IMSI comprises a complete IMSI.

12. The mobile device of claim 9, wherein the steps further include:
providing the second eSIM to the eUICC for installation.

13. The mobile device of claim 9, wherein the second IMSI is unlikely to result in a paging collision when the second eSIM is operated alongside the first eSIM.

14. The mobile device of claim 9, further comprising a removable universal integrated circuit card (UICC).

15. The mobile device of claim 14, wherein the request further includes at least a portion of a third IMSI associated with a subscriber identity module (SIM) installed on the removable UICC.

16. A non-transitory computer readable storage medium configured to store instructions that, when executed by a processor included in a provisioning server, cause the provisioning server to select a particular electronic Subscriber Identity Module (eSIM) for a mobile device, by carrying out steps that include:

receiving, from a mobile device, a first provisioning request comprising at least a portion of a first international mobile subscriber identity (IMSI), wherein: i) the first IMSI is associated with a first electronic subscriber identity module (eSIM), ii) the first eSIM is present on an embedded universal integrated circuit card (eUICC), iii) the eUICC is included in the mobile device, iv) the request is for a second eSIM, and v) the second eSIM is associated with a second IMSI different than the first IMSI;

identifying, based on the at least a portion of the first IMSI, a particular eSIM as the second eSIM to provide to the mobile device; and providing, to the mobile device, the particular eSIM.

17. The non-transitory computer readable storage medium of claim 16, wherein the steps further include:

performing paging occasion calculations using the at least a portion of the first IMSI.

18. The non-transitory computer readable storage medium of claim 16, wherein the particular eSIM is identified based on the paging occasion calculations.

19. The non-transitory computer readable storage medium of claim 16, wherein the first provisioning request further comprises a mobile network operator (MNO) identifier that identifies an MNO associated with the second eSIM.

20. The non-transitory computer readable storage medium of claim 16, wherein the second IMSI that is unlikely to result in a paging collision when the particular eSIM is operated alongside the first eSIM.

* * * * *